M. J. McCLOUD.
VALVE.
APPLICATION FILED MAY 22, 1911.
1,014,501.
Patented Jan. 9, 1912.
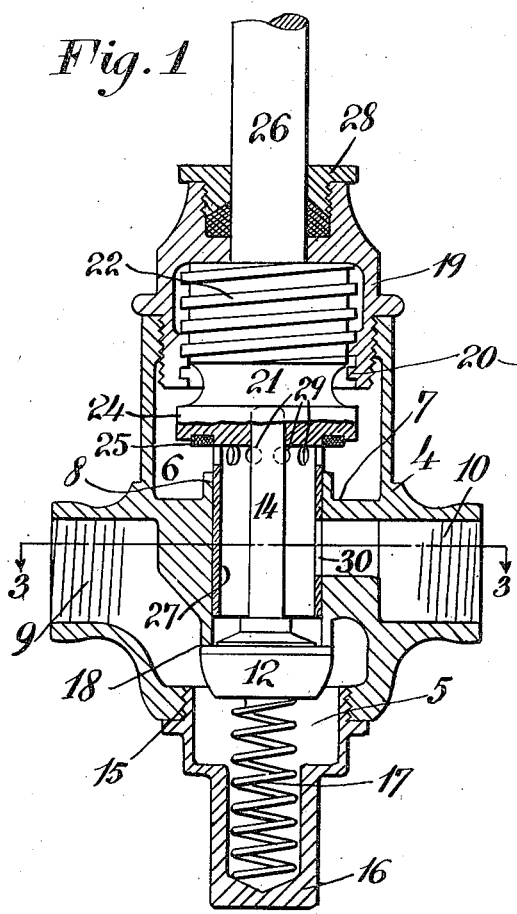
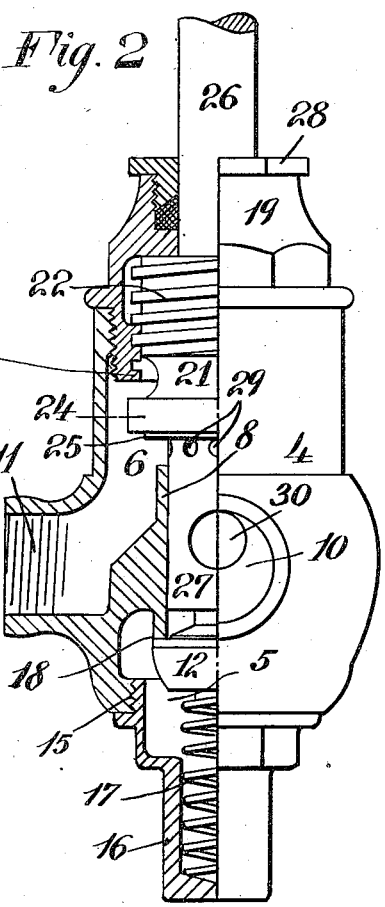
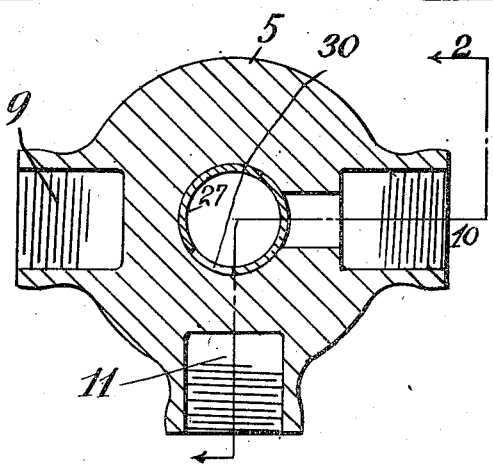
Witnesses:
Inventor
Michael J. McCloud,
By his Attorney

UNITED STATES PATENT OFFICE.

MICHAEL J. McCLOUD, OF BROOKLYN, NEW YORK, ASSIGNOR TO ISRAEL E. IKELHEIMER, OF NEW YORK, N. Y.

VALVE.

1,014,501.  Specification of Letters Patent.  Patented Jan. 9, 1912.

Application filed May 22, 1911. Serial No. 628,627.

*To all whom it may concern:*

Be it known that I, MICHAEL J. McCLOUD, a citizen of the United States of America, residing at the borough of Brooklyn, in the county of Kings and State of New York, have invented certain new and useful Improvements in Valves, of which the following is a specification.

My invention relates to valves, and particularly to that class of valves which are used to control the passage of both hot and cold water, and it consists in the combination of inlets, outlets and cut offs, so arranged that I am able, with one turn of the valve stem, to admit water of one temperature, then, in addition, to admit water of another temperature, the water of both temperatures commingling and being discharged at the thus regulated temperature, and finally to entirely cut off water of the first temperature and admit only that of the last temperature.

Figure 1, is a central vertical sectional view of a valve embodying my invention, taken on the line which cuts the inlet and outlet. Fig. 2, is in part, a sectional view on the line showing the discharge outlet, and in part, a side view of the complete device. Fig. 3, is a horizontal sectional view on line 3—3 of Fig. 2.

This valve consists of a casing 4, divided into an upper chamber 6, and a lower chamber 5, by a diaphragm or central portion 7. A sleeve 8, extends upward into the upper chamber and downward into the lower chamber, projecting a short distance into each, said sleeve, as shown, being made integral with the diaphragm or central portion of the valve itself.

9 is the cold water inlet leading from the threaded opening, into the lower chamber of the valve casing.

10 is the hot water inlet, constructed as a passage leading from the threaded opening at the side, directly into the space within the sleeve 8.

11 is the discharge opening and is connected by the passage shown in Fig. 2, with the upper chamber 6, of the valve casing. The lower chamber of the valve casing is supplied with a valve disk 12, provided with a stem 14, which reaches up into the space within the sleeve aforesaid. It is preferably provided with a rubber washer to insure its tight setting upon the lower end of the sleeve or flange 8. The lower part of the casing is apertured and threaded, as shown at 15, to receive a recessed plug 16, threaded to engage the thread of orifice 15 and provided with a spring 17, seated in its recess and adapted, when the plug is in place, to bear upon the lower end of the valve 12, so as to hold that to its seat 18, when the position of the stem permits, though the spring is not absolutely necessary. When this valve is tightly seated upon its seat, water may enter chamber 5, through the cold water inlet, but cannot escape therefrom. The upper end of the casing is also threaded and provided with a plug 19, which screws into said thread and is itself internally threaded, with a quick acting thread 20. In this quick acting thread 20 there is located a second valve 21, provided on its exterior with a quick acting thread 22, adapted to take with the quick acting thread 20, and at the end with a valve disk 24, preferably provided with a rubber washer 25, seated in a recess cut in its face. It has also a stem 26, extending out through the end of plug 19, and adapted to receive a handle or other means for turning the valve. A stuffing box plunger 28, is preferably provided to insure against leakage between the valve stem and the apertured threaded plug, 19. Below the valve disk 24, the valve is provided with a hollow cylindrical extension 27, adapted to pass down inside of the sleeve 8. It is provided with a series of apertures 29, which when the device is assembled may lie in a plane below the bottom edge of sleeve 8, and a single aperture 30, will then register with the aperture 10 from the hot water inlet. The depth of this hollow cylinder and the length of the stem of valve 12 are so proportioned that when the disk is closed against its seat, the said stem rests upon the bottom of the recessed or hollow portion of said disk, but holds disk 12 from its seat.

The operation of the valve is as follows: Normally the disk 24 is pressed tightly against its seat on the upper face of sleeve (or seat) 8, thus closing all passages from the inlets to the outlet. At the same time, by reason of the proportions of valve stem, 14, the valve disk 12 is held below its seat and water entering the cold water inlet may pass to chamber 5, then between disk 12 and its seat, into the hollow cylinder 27. A very slight turn of the handle of the valve withdraws the disk 24 from its seat, and thereupon the cold water already in the hollow cylinder, may pass out of apertures 29, and thence to and through the discharge opening 11. As the stem is turned farther around, the aperture 30 begins to register with the passage from the hot water inlet and hot water also entering from the passage thus provided, flows into the hollow cylinder, mixes with the cold water entering therein and passes out in the manner already described. Further turning of the valve handle in the direction of the initial movement, carries the valve disk 21 up until the valve stem 14 resting upon the bottom thereof, is raised sufficiently to permit the disk 12 to seat itself upon the lower end of the sleeve (or seat) 8, thus cutting off the cold water, that movement of the disk being aided by the spring 17. It is thus seen that by the turning of the valve stem, only a few degrees, the objects desired are attained. First turning on the cold water, then securing the passage of warmer liquid by permitting the hot water to enter and mix with the cold, gradually increasing the quantity of hot water admitted up to the limit of its temperature, and then shutting off the cold water.

What I claim as my invention and desire to secure by Letters Patent is:—

1. In a valve the combination of a casing provided with a cold water port, a hot water port, a discharge port, two chambers, a connecting passage leading from one chamber to the other chamber, provided with valve seats at its respective ends, a hollow rotatable plug, located within said passage and provided with a valve disk and an aperture leading through the wall of the plug on a line below the disk and above the valve seat, when the valve is open, quick acting threads on the valve disk and the valve casing in coöperative engagement with each other, a stem extending through the casing, a passage leading from the upper chamber to the main discharge port, a spring, a spring pressed valve adapted to close the lower end of the connecting passage, and provided with a stem reaching to and bearing against said valve disk, an inlet leading from the cold water port into the lower chamber, an inlet leading from the hot water port to the space within the connecting passage and an aperture in the wall of the hollow plug, adapted to register with the hot water passage during a portion of the rotation of the plug, all substantially as set forth.

2. In a valve the combination of a casing provided with a cold water port, a hot water port, a discharge port, two chambers, a connecting passage leading from one chamber to the other chamber, provided with valve seats at its respective ends, a hollow rotatable plug, located within said passage and provided with a valve disk and an aperture leading through the wall of the plug on a line below the disk and above the valve seat, when the valve is open, quick acting threads on the valve disk and the valve casing, in coöperative engagement with each other, a stem extending through the casing, a passage leading from the upper chamber to the main discharge port, a valve, adapted to close the lower end of the connecting passage, and provided with a stem reaching to and bearing against said valve disk, an inlet leading from the cold water port into the lower chamber, an inlet leading from the hot water port to the space within the connecting passage and an aperture in the wall of the hollow plug, adapted to register with the hot water passage during a portion of the rotation of the plug, all substantially as set forth.

In testimony whereof, I have signed my name to this specification in the presence of two subscribing witnesses, this 3rd day of May 1911.

MICHAEL J. McCLOUD.

Witnesses:
A. G. N. VERMILYA,
JAMES A. DONEGAN.